United States Patent [19]

Bersch et al.

[11] Patent Number: 5,021,627
[45] Date of Patent: Jun. 4, 1991

[54] ELECTRODE FOR RESISTANCE WELDING SURFACE-TREATED SHEETS OF STEEL AND METHOD OF MANUFACTURING SUCH ELECTRODES

[75] Inventors: Bernhard Bersch; Axel Fuchs, both of Dortmund, Fed. Rep. of Germany; Ralf Eck, Reutte/Tirol, Austria

[73] Assignee: Hoesch Stahl AG, Dortmund, Fed. Rep. of Germany

[21] Appl. No.: 478,622

[22] Filed: Feb. 12, 1990

[30] Foreign Application Priority Data

Feb. 13, 1989 [DE] Fed. Rep. of Germany ....... 3904213

[51] Int. Cl.$^5$ .............................................. B23K 35/22
[52] U.S. Cl. ...................................... 219/119; 219/84; 219/120
[58] Field of Search ...................... 219/119, 120, 84

[56] References Cited

U.S. PATENT DOCUMENTS

| 2,257,566 | 9/1941 | Lewis | 219/120 |
| 3,109,087 | 10/1963 | Larkworthy | 219/120 |

FOREIGN PATENT DOCUMENTS

| 2518308 | 11/1975 | Fed. Rep. of Germany | 219/119 |
| 2804816 | 8/1979 | Fed. Rep. of Germany | 219/119 |
| 2424093 | 12/1979 | France | 219/119 |
| 59-41838 | 10/1984 | Japan | 219/119 |

Primary Examiner—Clifford C. Shaw
Attorney, Agent, or Firm—Max Fogiel

[57] ABSTRACT

The invention concerns an electrode for the resistance welding of sheets of surface-treated steel. A thin disk of high melting-point metal is permanently attached to the electrode's shaft or cap at the contact surface. The grain of the high melting-point metal is oriented at an angle to the axis of the electrode and the rolled-out material has a flattened grain.

14 Claims, 3 Drawing Sheets

ELECTRODE FOR RESISTANCE WELDING SURFACE-TREATED SHEETS OF STEEL AND METHOD OF MANUFACTURING SUCH ELECTRODES

BACKGROUND OF THE INVENTION

The increasing number of various types of corrosive materials has accelerated the need to develop methods of treating the surface of sheets of steel to prevent their corrosion. A significant position in the wide range of these methods is occupied by thin galvanized sheet. The percentage of alloying metals plays a decisive part in relation to later processing.

The constant increase in the use of galvanized steel raises the question of how the material can be attached using known economical finishing processes. The special structure of the zinc coating produced for example by continuous galvanization entails no problems in shaping. The opposite, however, is true for welding. Of the welding processes most commonly used with steel sheet—spot, projection, and seam—spot welding is the most difficult because the electrode productivity can only be considered too low, especially for the economically preferable automatic welding.

"Electrode productivity" in this context means the number of welds of adequate quality that can be obtained with one electrode without reconditioning the contact surface of the electrode or the interface between the electrode and the material being welded. The quality of a spot weld can be determined by several methods, the most important of which are the free shearing-tension test,
the torsion test,
the button test, and
microscopic examination of the polished joint.

Extensive studies have accordingly been devoted to developing material-specific welding techniques and to either increasing electrode productivity or explaining why it is so low in spot-welding galvanized sheets.

Low electrode productivity derives from the tendency of zinc to alloy with the electrode's copper. The creation of an alloyed coating on the operating surface of the electrode changes the resistance of the spot-welding circuit. The resistance at the interface between the electrode and the sheet increases. The result is higher heat at the weld, which in turn accelerates the alloying of the electrode. The quality of the welds decreases rapidly as their number increases. It is accordingly necessary to make the electrodes out of a material that will not alloy with zinc. Tungsten, which has a high melting point, suggests itself for insertion into a copper electrode.

Attempts have been made to solve the problem in composite electrodes of the type known from German OS 1 565 318 by positioning the various components next to one another.

The object of both German OS 2 554 990 and German Patent 1 914 106 is to provide a longer-lived electrode by embedding a pin of heat-resistant material in its contact surface German Patent 625 201 discloses an electrode with inserts of a difficult-to-melt metal, preferably in the form of a sheet embedded in the more readily melting metal with its grain more or less paralleling the direction of the electric current.

German AS 2 203 776 discloses electrodes with contact surfaces made of alloys with crystals that have longitudinally oriented separated phases.

U.S. Pat. No. 3,665,145 discloses electrodes with capped points and disks of high melting-point materials.

Professors Matting and Krüger of the Hanover Institute of Technology have thoroughly studied the lives of molybdenum-and-tungsten electrodes used for spot-welding thin galvanized sheet metal. The results are presented in the journal Bänder Bleche Rohre 8 (1967), 5 & 6.

In spite of the range of this research, however, the results were not satisfactory. When the high melting-point inserts were very long and thick, they could not be water-cooled adequately enough to remove the heat. Again, a thick tungsten insert is a very poor conductor of electricity and impedes heat dissipation. Practical tests were accordingly mostly unsuccessful. It was impossible to reproduce welds with the same quality.

It was determined that the lack of reproducibility was of thermal origin. Cracks were discovered in the tungsten inserts, and the contact surface was perceptibly roughened. Small particles of tungsten were uniformly distributed over the whole area. Certain magnifications of the cracks revealed a medium-gray substance. It was accordingly easy to conclude that the zinc in the steel sheeting had become forced into the cracks during the welding process and, due to the intense heat, had diffused along the grain boundaries and into the tungsten. This situation has a certain explosive effect that allows the tungsten to escape. Simultaneously, however, it also increases the electrode's electric resistance, leading to an increase or readjustment of the welding current. The more powerful current, however, again increases the level of heat in the electrode. The diffused zinc creates an insulating layer and also prevents the transition of heat into the cooled copper. The buildup of heat, however, simultaneously promotes the creation of an alloy.

These tests were conducted on electrodes with tungsten or molybdenum inserts. The inserts were stripped from conventional rod material and were relatively long because they had to be reliably secured in the shaft of the electrode. The grain orientation, however, was along the current direction, parallel, that is, to the length of the electrode. The productivity of the electrodes with inserts of this type varied widely, and no definite reproducibility has been attained at the state of the art.

Specifically, a material for electrodes for spot-welding galvanized sheets must alloy with zinc only slightly if at all,
remain hard at high temperatures, and
have a low electric resistance and satisfactory heat conductivity.

SUMMARY OF THE INVENTION

The object of the invention is accordingly to provide an electrode for resistance welding with a productivity that is reproducible and essentially higher than those of known electrodes without complicated regulation of the welding current and that will ensure constant and high-quality spot welding throughout its life without cracks in the vicinity of the weld. The attainment of this object is particularly desirable in view of the powerful increase in the consumption of galvanized sheet steel, mostly surface-treated, in the automotive industry, where it must increasingly satisfy product liability.

This object is attained in that an electrode or electrode cap with satisfactory electric conductivity is solidly secured at the interface to a thin disk of a high melting-point metal, preferably tungsten or an alloy of various appropriate metals, with a very flat grain oriented across the longitudinal axis of the electrode. The absence of copper at the interface with the material being welded eliminates the risk of cracking. The cracking range is rapidly attained with copper electricity because increasing the current also increases thermal stress, and the melting point of the copper is soon exceeded. The molten zinc from the coating also penetrates into the electrode and contaminates the copper.

The invention is especially useful for preventing cracking and ensuring a high-quality weld in view of the increasing level of product liability.

BRIEF DESCRIPTION OF THE DRAWINGS

The invention will now be described with reference to the drawings, which illustrate various potential embodiments by way of example and wherein.

DESCRIPTION OF THE PREFERRED EMBODIMENTS

Figure 1:
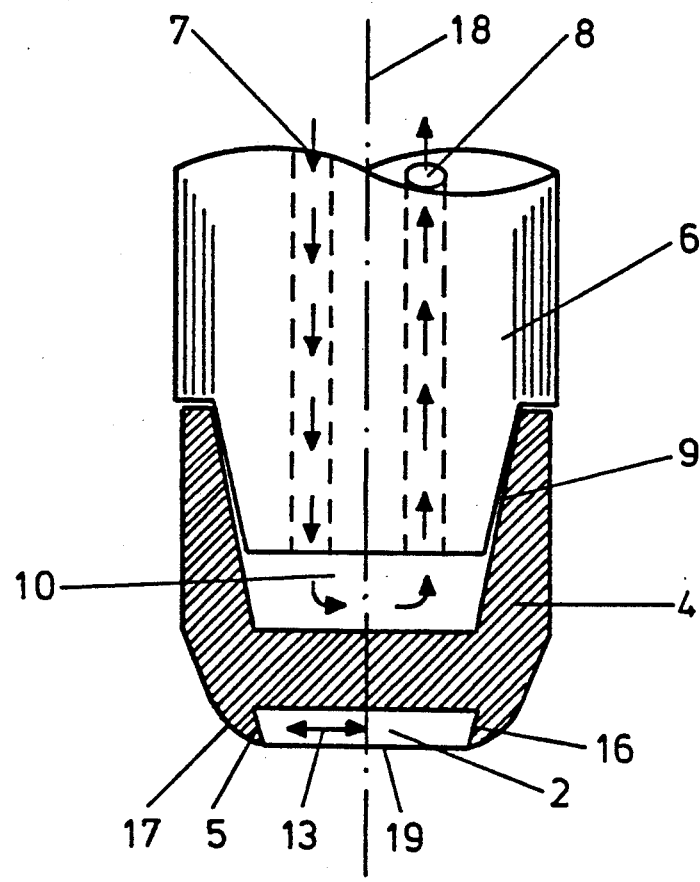
FIG. 1 illustrates the shaft of an electrode covered by a cap, FIG. 2 the shaft of an electrode with a contact disk, FIG. 3 a composite of copper and a high melting-point metal, FIG. 4 a contact roller with a composite, FIG. 5 a blank made out of a composite, and FIG. 6 a hammered electrode cap.
Figure 2:
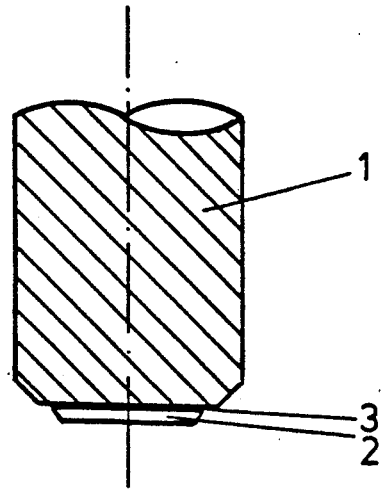
Figure 3:
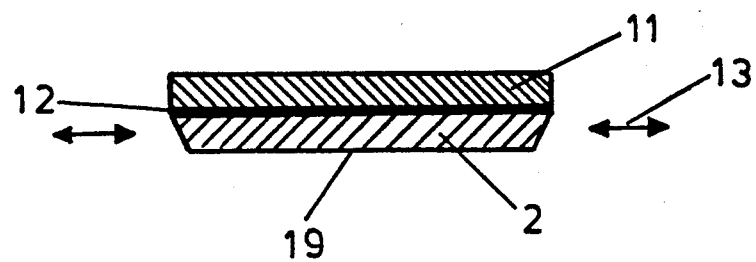
Figure 4:
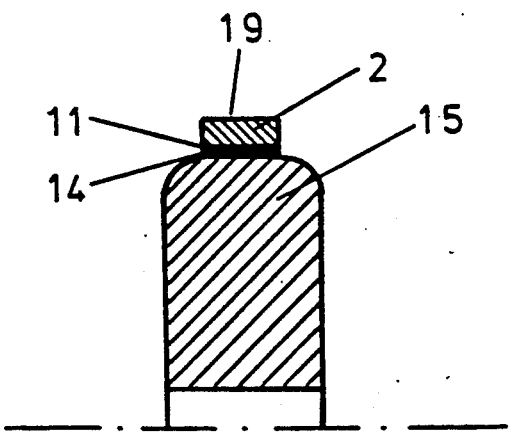
Figure 5:
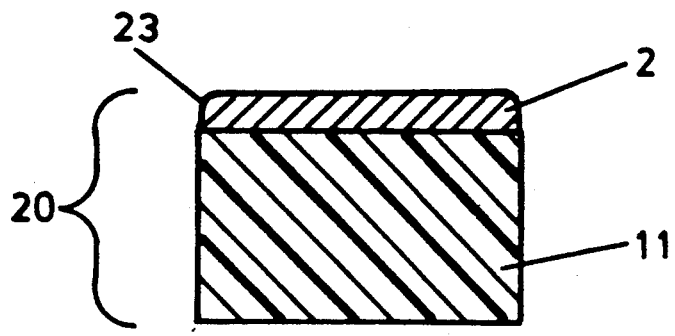
Figure 6:
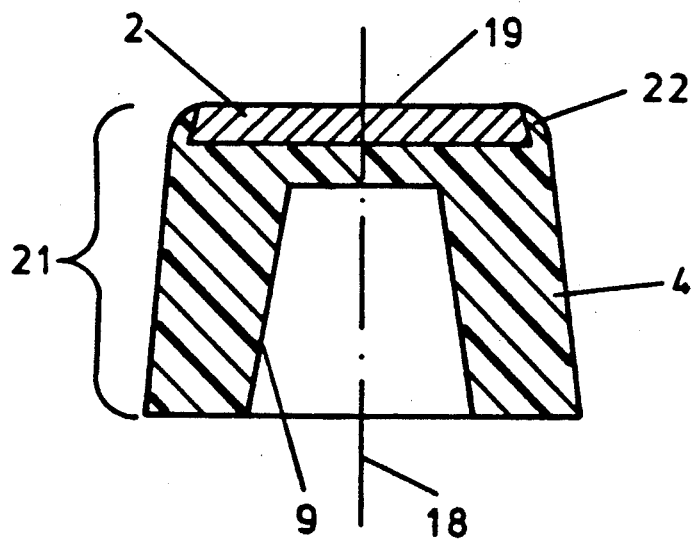

A disk 2 less than 4 mm thick is secured tight to the contact surface of an electrode. The thinner the disk, the more satisfactorily the electrode will cool. Electric resistance will also be lower when the disk is very thin. How thin a disk can be is dictated by its mechanical strength. The improved cooling characteristic of thinner disks decreases the electrodes' tendency to adhere to any surface-treated steel sheet being welded.

Disk 2 is made out of a pure and high melting-point metal, preferably tungsten or molybdenum. Since, however, such pure metals are extremely brittle, they can also be alloyed with other high melting-point metals, rhenium for example. Even chrome can be employed as a binder with a low percentage of alloying element. And the oxides can be employed instead of the pure elements.

Any appropriate high melting-point metals can be used in the alloys, which can also be varied with 0.1–15% hafnium and/or 0.1–15% zirconium and/or 0.15–15% titanium and/or 0.01–3% carbon. Pure oxides can also be added.

Molybdenum can also be doped with aluminum, potassium, or silicon or have their oxides dispersed through it. 0.05–25% oxide in the form of an oxide ceramic with an oxide melting point above 1500° C. can also be added. Appropriate oxides for example are Mo 15 $ZrO_2$, Mo 15 $CeO_2$, and Mo 15 $La_2O_3$.

Care must be taken to ensure that the electric conductivity of any alloy used is adequate.

To prevent deleterious materials deriving from the surface of the sheet from diffusing into the grain the orientation 13 of the grain must be at an angle to the axis 18 of the electrode, the only way to ensure that disk 2 will retain its physical properties. Thin disks are obtained by rolling the starting material, which automatically orients the grain correctly and stretches it. A large and flat grain is better for this purpose than a small and flat grain. The larger grain means fewer boundaries perpendicular to the surface and eliminates edge breakouts.

There are, depending on the application, various methods of securing disk 2 to electrode shaft 1 or to the cap. Economical methods are hard soldering, friction welding, explosion plating, compression molding, hammering, and backing.

In hard soldering, the punched-out disk 2, which has a certain ductility, is permanently secured to the electrode shaft 1 at a joint 3 with an appropriate solder. The thinner the disk, the more difficult it is to secure. Disk 2 has a surface 5 in the shape of a truncated cone and is very easy to cast in the same step as the cap. Since the smaller base of the disk is its contact surface 19, it is securely enclosed in the electrode material 16 and cannot fall out.

Another economical means of mounting would be compression molding or hammering. Since the material that the cap 4 is made out of is relatively soft, disk 2 can be inserted and the edge 17 of the cap can be rounded off in one operation. Hammering will completely close up all the space around the disk. The copper can be said to flow. Since cap 4 is a throw-away component and can be changed at the beginning of every shift in the automotive industry for example, the approach just described represents a cost-effective alternative to other types of electrode. Reconditioning the caps is not economical.

Another advantage of a cap 4 is that the starting material can be electrolytic copper, which has better electric and thermal conductivity than other metals or alloys.

It is, however, also possible to manufacture a composite disk from a high melting-point metal and electrolytic copper 11. A strip of tungsten for example can be rolled to the desired thinness, a process that also provides the structure with a longitudinal grain. A thin layer of electrolytic copper 11 can be poured or galvanized onto one side of the strip to form a permanent joint 12 with the tungsten. Round disks can now be punched out of the composite to the size of contact surface 19. The thin layer of electrolytic copper 11 allows the disks to economically be hard soldered, by induction for instance, to the electrode shaft 1 or cap 4 without any problems.

A very economical method of attaching caps 4 is to hammer them out of a composite of high melting-point metal and copper.

In this method, however, the layer of electrolytic copper 11 must be substantially thicker than disk 2. Disks are then stamped out of the flat material. The stamping slightly rounds off the edges 23 of the high melting-point metal. The disks of composite are then further processed in a device not described herein, with the soft electrolytic copper 11 being simultaneously hammered into the desired shape of a cap 4. The tool is shaped to force the copper around the rounded edges 23 of disk 2, resulting in a bezel 22 that makes the disk even more secure. To keep contact surface 19 free of copper, cap 4 must sometimes be further processed.

The starting material for cap 4 can also be a core of electrolytic copper 11. A disk 2 is secured by friction welding, explosion plating, or induction soldering and the cap hammered on.

The thin disks 2 employed make it possible to vary the structure of the electrode to improve cooling. The copper in cap 4 is directly below the disk and dissipates heat better than tungsten for example. The cap is secured for instance on a cone 9 on an electrode mount 6. Cooling water flows through a channel 7 in the mount. Between the mount and the cap is an empty space 10, which the water flows into. The heat that occurs at contact surface 19 is dissipated due to the difference in temperature between space 10 and cap 4. The temperature of the water rises as it leaves by way of another channel 8. The high percentage of copper keeps the system from heating up. The heat is diverted directly from where it occurs. The dissipation is more effective the thinner the disk.

The improved heat dissipation, however, simultaneously reduces the adhesive tendency of contact surface 19. If on the other hand an electrode still tends to adhere, disk 2 can still not be forced out of place because the way it is secured will not be affected.

Based on an extensive series of tests, it can be said that the invention ensures a heretofore unattained reproducibility with respect to the quality of spot welds. Furthermore, an adequate number of constantly high-quality welds can be produced in an automated line without changing the electrode caps. The invention increases the reliability of the welding process.

We claim:

1. An electrode for electric resistance welding of surface-treated steel sheets, comprising: a member of at least copper with a longitudinal axis and having electrical conductivity and substantially high mechanical strength; a substantially high melting-point metal element joined to said member at an interface; said metal element comprising a disk thinner than 4 mm and with a flattened granular structure with grains extending transversely to said longitudinal axis; said metal element having a contact surface with said steel sheets that is free of copper.

2. An electrode as defined in claim 1, wherein said disk is comprised of a metal selected from the group of pure molybdenum and pure tungsten.

3. An electrode as defined in claim 2, including oxides in said disk.

4. An electrode as defined in claim 1, wherein said disk is comprised of an alloy selected from the group of tungsten, molybdenum, and rhenium.

5. An electrode as defined in claim 1, wherein said disk is comprised of an alloy selected from the group of molybdenum, tungsten, and chromium, and with an amount of substantially 0.1–15% selected from the group of hafnium, zirconium, and titanium, and selectively with 0.01–3% carbon.

6. An electrode as defined in claim 1, wherein said disk is comprised of a metal selected from the group of molybdenum, tungsten, and chromium doped with a stacked structure selected from the group of aluminum, potassium, silicon, and rare-earth elements.

7. An electrode as defined in claim 1, wherein said disk is comprised of a metal selected from the group of molybdenum, tungsten, and chromium doped with oxides dispersed through said metal.

8. An electrode as defined in claim 1, wherein said disk comprises a truncated cone with a larger base permanently attached to said copper member.

9. An electrode as defined in claim 1, wherein said metal element comprises a composite disk punched out from a rolled-out strip and coated with a substantially thin coating of electrolytic copper, said disk being permanently attached to said copper member.

10. An electrode as defined in claim 1, including a cap of pure copper and having a tip secured to said disk, said cap being mountable on and removable from an electrode mount.

11. An electrode as defined in claim 1, including an electrode mount with a cap of an alloy selected from the group of copper, chromium, and zirconium, said cap having a tip secured to said disk, said cap being mountable on and removable from said electrode mount.

12. An electrode as defined in claim 1, including a layer of electrolytic copper on said disk and having a thickness substantially greater than the thickness of said disk.

13. An electrode as defined in claim 12, including an electrode mount; a cap stamped out of a composite material including said electrolytic copper layer and hammered into a predetermined shape with a securing cone, said cap having ends forced around edges of said disk.

14. An electrode for electric resistance welding of surface-treated steel sheets, comprising: roller of at least copper having electrical conductivity and substantially high mechanical strength; a substantially high melting-point metal element joined to said roller at an interface; said metal element comprising a ring-shaped element thinner than 4 mm and with a flattened granular structure extending transversely to radii of said roller, said ring-shaped element having a contact surface with said steel sheets that is free of copper.

* * * * *